United States Patent [19]

Kondo et al.

[11] Patent Number: 5,347,643
[45] Date of Patent: Sep. 13, 1994

[54] BUS SYSTEM FOR COORDINATING INTERNAL AND EXTERNAL DIRECT MEMORY ACCESS CONTROLLERS

[75] Inventors: Nobukazu Kondo, Fujisawa; Takashi Maruyama, Ebina; Keiichi Isamu, Nagoya; Hiroaki Aotsu, Yokohama, all of Japan

[73] Assignee: Hitachi, Ltd., Tokyo, Japan

[21] Appl. No.: 656,676

[22] Filed: Feb. 19, 1991

[30] Foreign Application Priority Data

Feb. 16, 1990 [JP] Japan .................. 2-033723

[51] Int. Cl.5 .................. G06F 13/368; G06F 13/28
[52] U.S. Cl. .................. 395/425; 364/228.5; 364/242.3; 364/242.31; 364/242.33; 364/243.41; 364/245.31; 364/259; 364/259.2; 364/260; 364/260.3; 364/256.3; 364/240; 364/931.43; 364/927.97; 364/941.2; 364/948.33; 364/961.2; 395/325; 395/400; 395/800
[58] Field of Search ......... 364/DIG. 1, 228.5, 243.41, 364/242.31, 240, 242.3, 245.31, 259, 927.97, 931.43, 947.2, 948.33, 961.2; 395/425, 800, 400, 325

[56] References Cited

U.S. PATENT DOCUMENTS

| | | | |
|---|---|---|---|
| 4,567,606 | 1/1986 | Vensko et al. | 381/43 |
| 4,626,985 | 12/1986 | Briggs | 395/800 |
| 4,760,524 | 7/1988 | Iwasaki et al. | 395/800 |
| 4,908,748 | 3/1990 | Pathak et al. | 395/400 |
| 4,912,636 | 3/1990 | Magar et al. | 395/425 |
| 5,005,121 | 4/1991 | Nakada et al. | 395/800 |
| 5,099,417 | 3/1992 | Magar et al. | 395/425 |
| 5,146,573 | 9/1992 | Sato et al. | 395/425 |
| 5,161,247 | 11/1992 | Murakami et al. | 395/800 |

FOREIGN PATENT DOCUMENTS 0066350 3/1987 Japan .

*Primary Examiner*—Joseph L. Dixon
*Assistant Examiner*—James Peikari
*Attorney, Agent, or Firm*—Antonelli, Terry, Stout & Kraus

[57] ABSTRACT

A one-chip microprocessor including an instruction execution unit, a DMA controller, and a memory management unit. The instruction execution unit has a logical address for storing an address to be accessed. The DMA controller has a DMA register for storing an address given when direct memory access is performed. The memory execution unit further includes an address converting means for converting a logical address stored in the logical address register of the instruction execution unit into a physical address to be accessed, a hit determining means for determining whether or not the cache memory connected as an external unit is hit on the basis of the physical address, and a burst transfer circuit for performing burst transfer of the cache memory. The one-chip microprocessor is connected by a bus to a system having a cache memory, a memory controller and a main memory.

1 Claim, 16 Drawing Sheets

DIRECT ACCESS

MEMORY ACCESS

BURST TRANSFER

DMA TRANSFER

FIG. 15 EXTERNAL DMA TRANSFER

CACHE NULLIFICATION

BUS SYSTEM FOR COORDINATING INTERNAL AND EXTERNAL DIRECT MEMORY ACCESS CONTROLLERS

BACKGROUND OF THE INVENTION

The present invention relates to an information processing system and a computer system having a multiplex bus and a cache memory, and more particularly to a one-chip microprocessor and its bus system.

As the related prior art of the present technical field, there has been proposed a system disclosed in JP-A-62-66350.

To reduce the information processing system in the foregoing prior art, the processor requires the address and data to be multiplexed.

SUMMARY OF THE INVENTION

It is therefore an object of the present invention to provide the most efficient bus system arrangement in an information processing system having a processor and a multiplex bus.

It is another object of the present invention to provide a one-chip microprocessor to be easily connected to an external peripheral device in an information processing system having two or more different storage devices.

In order to achieve the foregoing first object in a preferred mode, the present invention provides a system arrangement which includes a memory controller for controlling main memory access and a cache memory, both being directly connected to a multiplex bus.

In order to achieve the foregoing other object in a preferred mode, the present invention provides an arrangement which is capable of decoding an address to be accessed, determining a device to be accessed, starting an access stage, supplying a control signal, and performing sizing of a bus in accordance with the determined device.

When accessing a cache memory and a main memory, both memories are directly connected to the multiplex bus so that the data stored in the memories are transmitted to the multiplex bus without passing through a driver. As a result, it is possible to define the data more rapidly and reduce access time.

Further, the one-chip microprocessor is capable of automatically performing the essential operation of a device to be accessed. Hence, no circuit dedicated for connection is required to be added external of the processor, resulting in connecting the microprocessor with a peripheral device more easily.

DESCRIPTION OF THE PREFERRED EMBODIMENT

Hereinafter, the description will be directed to an illustrative embodiment of the present invention.

Figure 1:
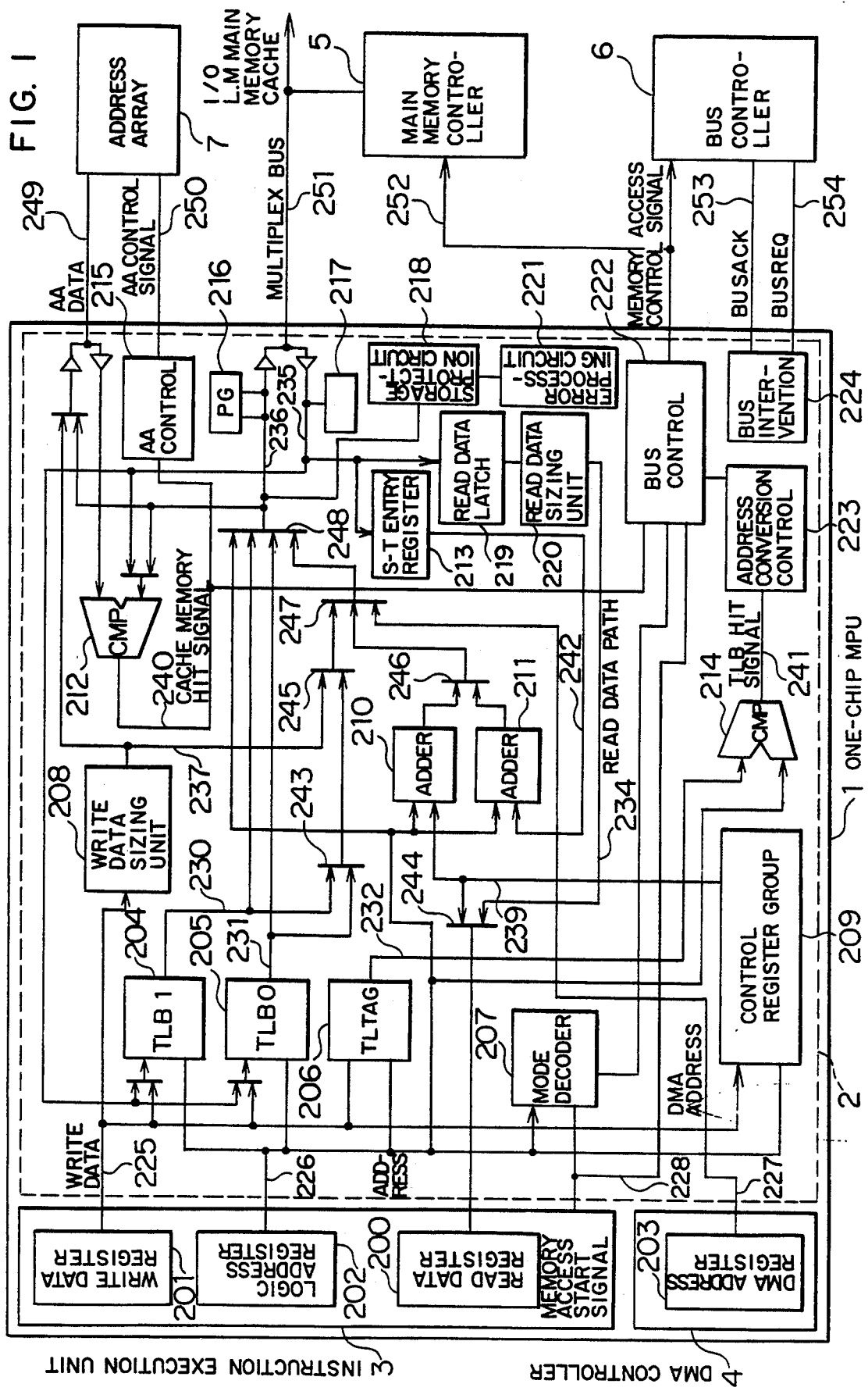
FIG. 1 is a block diagram showing a one-chip microprocessor according to an embodiment of the present invention.

FIG. 1 is a block diagram showing a one-chip microprocessor according to an embodiment of the invention. As shown, 1 denotes a one-chip microprocessor (MPU), 2 denotes a memory management unit, 3 denotes an instruction execution unit, 4 denotes a direct memory access (DMA) controller, 5 denotes a main memory controller, 6 denotes a bus controller, 7 denotes an address array for a cache memory, 201 denotes a write data register, 202 denotes a logic address register (logical address register), 200 denotes a read data register, 203 denotes a DMA address register, 204 denotes an address conversion buffer 1 (TLB1), 205 denotes an address conversion buffer 0 (TLB0), 206 denotes a TLB tag, 207 denotes a mode decoder, 208 denotes a write data sizing unit, 209 denotes a control register group, each of 210 and 211 denotes an adder, 212 denotes a cache memory hit determining unit, 213 denotes a segment table entry register, 214 denotes a TLB hit determining unit, 215 denotes an address control unit for a cache memory, 216 denotes a parity generator, 217 denotes a parity checker, 218 denotes a storage protecting circuit, 219 denotes a read data latch, 220 denotes a sizing unit for read data, 221 denotes a storage protection error processing unit, 222 denotes a bus control unit, 223 denotes an address conversion control unit, 224 denotes a bus intervention unit, 225 denotes write data, 226 denotes a logic address, 227 denotes a DMA address, 228 denotes a memory access start signal, 230 denotes TLB1 data, 232 denotes TLB0 data, 232 denotes tag data, 234 denotes a read data bus, 235 denotes input data for multiplex bus, 236 denotes an output path for a multiplex bus, 237 denotes sizing-processed write data, 239 denotes a control-register output, 240 denotes a cache memory hit signal, 241 denotes a TLB hit signal, 242 denotes a segment table register output, 243 to 248 denote selectors, 249 denotes address array data, 250 denotes an address array control signal, 251 denotes a multiplex bus, 252 denotes a memory access control signal, 253 denotes a bus releasing signal (BUSACK), and 254 denotes a bus releasing request signal.

Figure 2:
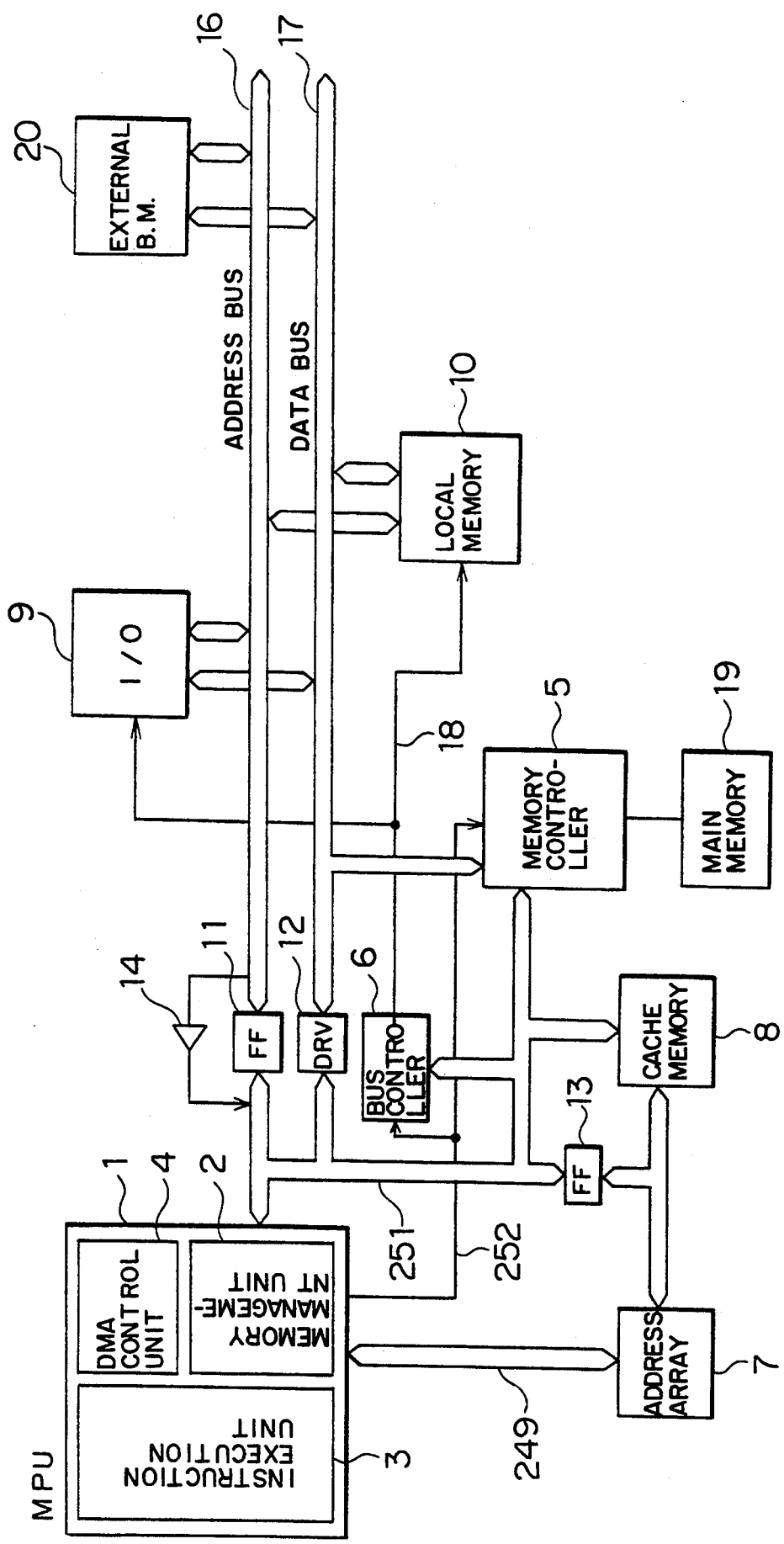
FIG. 2 is a block diagram showing a system including the one-chip microprocessor shown in FIG. 1.

FIG. 2 is a block diagram showing the system of the present invention employing the foregoing MPU. As shown, 8 denotes a cache memory, 9 denotes an input and output (I/O) unit, 10 denotes a local memory, 11 denotes an address latch, 12 denotes a driver for controlling data direction, 13 denotes an address latch for controlling a cache memory and an address array, 14 denotes a driver for an address-bus path, 16 denotes an address bus, 17 denotes a data bus, 18 denotes an access control signal dedicated for the I/O unit and the local memory, 19 denotes a main storage. The system is arranged so that the cache memory 8 and the memory controller 5 are directly connected to the multiplex bus 251. This arrangement allows data to be directly transmitted to the multiplex bus without having to pass through the driver when accessing the cache memory or the main memory. The arrangement makes it possible to define the data more rapidly and to reduce the access time. The operation of the arrangement shown in FIG. 2 will be detailed later.

Figure 3:
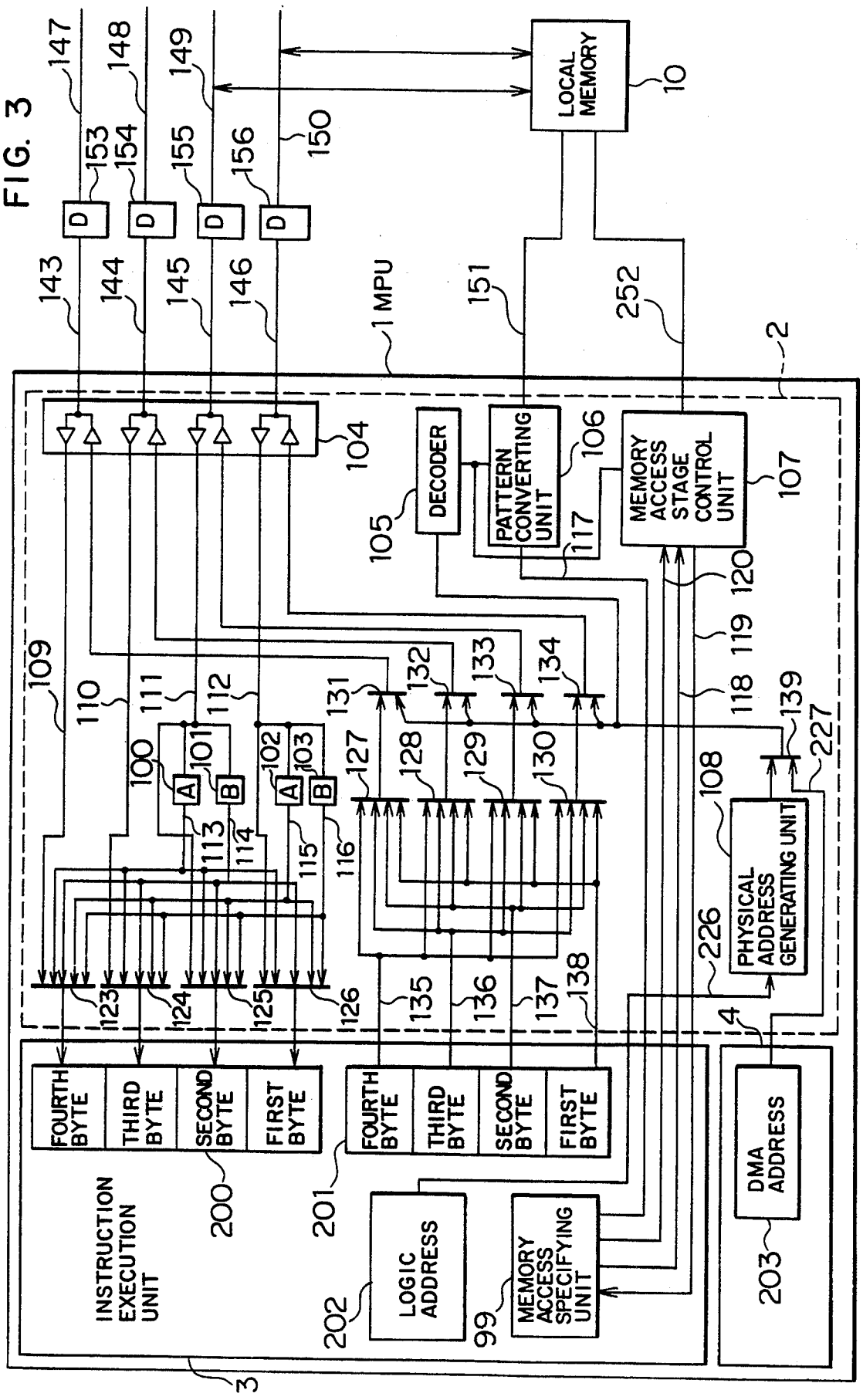
FIG. 3 is a circuit diagram showing a bus-sizing section included in the one-chip microprocessor shown in FIG. 1.

FIG. 3 is a block diagram showing a bus sizing section suitable for use as the write data sizing unit 208 and the read data sizing unit 220 in detail. As shown, 99 denotes a memory access specifying unit, 100 to 103 denote data latches, 104 denotes a bidirectional buffer, 105 denotes a physical address decoder for executing memory access, 106 denotes a byte-unit memory access specifying pattern conversion unit, 107 denotes a memory access stage control unit, 108 denotes a physical address generation unit, 143 to 146 denote four bytes counted from the upper order of a 32-bit width multiplex bus, 109 to 112 denote byte-unit input data respectively corresponding to each of the four bytes of the multiplex bus, 135 to 138 denote each byte-unit bus counted from an upper order of the write data register, 123 to 134 and 139 denote selectors, 118 denotes a memory access start signal, 119 denotes a memory access termination reporting signal, 120 denotes an access mode specifying signal, 117 denotes an access pattern specifying signal for each byte, 153 to 156 denote drivers for controlling data direction, 147 to 150 denote data buses corresponding to each of the four bytes (143 to 146) of the multiplex bus, 151 denotes a byte-unit memory access specifying pattern, 113 to 116 denote outputs of the data latches 100 to 103.

Turning to FIG. 1, when the MPU 1 starts to access the main memory, the MPU 1 sets a logic address in the logic address register 202, and if a write access is to be done, sets the data in the write data register 201.

The write mode or read mode is specified in response to a memory access control signal 252 sent from the bus control unit 222 to the bus controller 6 and the main memory controller 5.

Next, in response to the memory access start signal 228, the mode decoder 207 serves to determine the region to be accessed by referencing the logic address 226. If the logic address 226 is located in virtual space, the TLB hit determining unit (CMP) 214 serves to determine which of TLBs 204 and 205 is to be hit. If either one is hit, the data of the hit TLB 204 or 205 is converted into a physical address through the selector 248 and is output to the multiplex bus 251 for doing access to the main memory. If both of the TLBs 204 and 205 are mishit, the address conversion control unit 223 serves to activate the bus control unit 222 for starting the 2-level paging address conversion control (segment page table). At a time, the adders 210 and 211 serve to respectively generate a segment table address and a page table address. In case the physical address is in the main memory, the cache memory hit determining unit 212 serves to compare the address array data 249 based on the physical address transmitted through the multiplex bus 251 and a part of the physical address for carrying out the cache-hit determination. If the cache memory is hit, when reading the main memory, the data is transmitted from the multiplex bus 251 to the read data register 200 through the read data bus 234. If the cache memory is mishit, when reading the main memory, the MPU 1 issues a request for replacing a block of the cache memory to the main memory controller 5 through the memory access control signal passed on the multiplex bus 251. In response to the request, the main memory controller 5 performs the block replacement. At a time, the address array is updated on the basis of the address array control signal 250 supplied from the address array control unit and the address array data 249. If the cache memory is hit, when writing data in the main memory, the entry is nullified by the address array control signal 250 and the address array data 249. The parity of the data and the address is generated in the parity generator (PG) 216 and checked in the parity checker (PCHK) 217.

For monitoring an address for memory protection and processing an error found when monitoring the address, there are provided a memory protecting circuit 218 and a memory protecting error processing unit 221.

Figure 4:
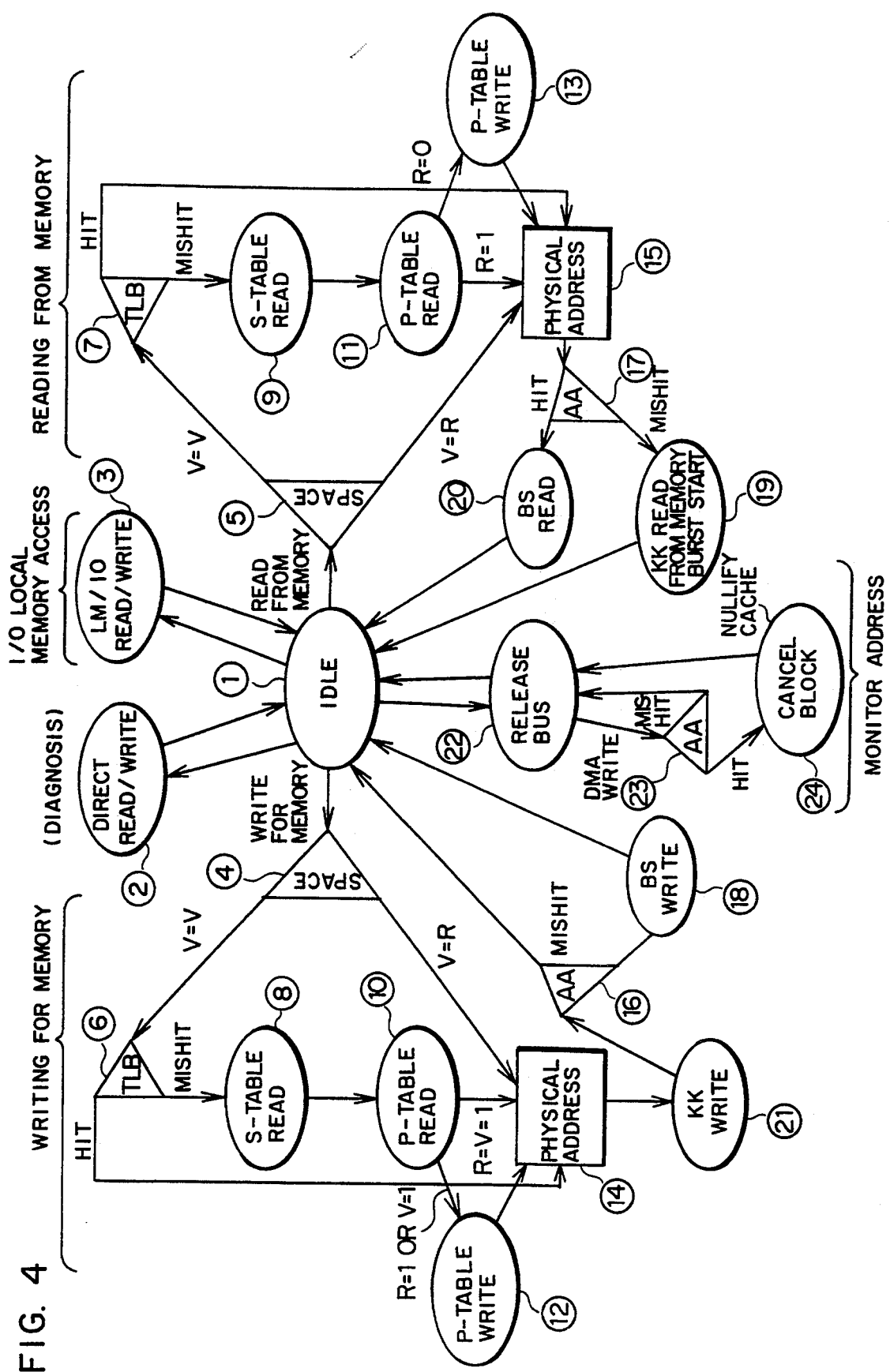
FIG. 4 is a diagram depicting a transition state of the one-chip microprocessor shown in FIG. 1.

The foregoing description has concerned the flow of the main signals in the one-chip microprocessor 1. With reference to the state transition view of FIG. 4, the flow will be discussed for each condition of the accessed destination. Each transition state shown in FIG. 4 will be described below.

① Idle state
② Direct access to the control registers of the bus controller 6 and the memory controller 5,
③ Access to the local memory and I/O,
④, ⑤ The mode decoder 207 determines which of the virtual space and the real space is to be accessed.
⑥, ⑦ Hit or Mishit or TLB is determined.
⑧, ⑨ Segment table for address replacement is read.
⑩, ⑪ Page table for address replacement is read.
⑫, ⑬ Page table for address replacement is written.
⑭, ⑮ After the address is converted, the physical address is generated.
⑯, ⑰ The address array determines whether the cache memory is hit or mishit.
⑱ Data is written in the cache memory.
⑲ The MPU 1 starts the burst transfer to the memory controller 5 and the memory read.
⑳ The cache memory is read.
㉑ The memory is written.
㉒ A bus right is released.
㉓ It is determined whether or not the address array is hit.
㉔ The cache memory is nullified.

At first, if the MPU 1 serves as a bus master, the object to be accessed is I real space, II virtual space TLB hit, II' virtual space TLB mishit, III direct read/write, or IV, I/O unit and local memory access.

I Real Space i) Cache Memory Hit

When reading the data, in the idle state ①, the mode decoder 207 serves to determine which one of the virtual space access and the real space access ⑤ is indicated. Since the physical address is in the real space, the address-converted physical address is generated ⑮. The address array determines whether the cache memory is hit or mishit ⑰. Since the cache memory is hit, the cache memory is read ⑳ and then is returned to the idle state ①.

When writing in the main memory, in the left-hand state transition view, the states are transited in the sequence of ①→④→ ⑭ → ㉑ → ⑯ → ⑱ →①.

ii) Cache Memory Mishit

When reading data in the cache memory, the cache memory is transited from the idle state ① to the state ⑮, because the mode decoder 207 determines which the virtual space or the real space is to be accessed. Since the physical address is in the real space in the state 15, the address-converted physical address is generated. Since the cache memory is mishit in the state ⑰, the cache memory is transited to the state ⑲ in which the MPU 1 starts the burst transfer to the memory controller 5 and the memory reading. Then, the cache memory is returned to the idle state ①.

When writing data in the cache memory, the state of the cache memory is transited in the sequence of the left-hand loop consisting of ①→④→ ⑭ → ㉑ → ⑯ =①.

II Virtual Space TLB Hit i) Cache Memory Hit

When reading the data from the cache memory, in the idle state ①, the mode decoder 207 serves to determine whether the virtual space or the real space is to be accessed ⑤. Since the virtual space is to be accessed, the TLB determines whether the cache memory is is hit or mishit ⑦. The address-converted physical address is generated ⑮. The address array then determines whether the cache memory is hit or mishit ⑰. Since the cache memory is hit, the data is read from the cache memory ⑳. The cache memory is then returned to the idle state ①.

When writing the data in the cache memory, the state of the cache memory is transited in the sequence of ①→④→⑥→ ⑭ → ㉑ → ⑯ → ⑱ →①.

ii) Cache Memory Mishit

When reading the data from the cache memory, in the idle state ①, the mode decoder 207 determines whether the accessed space is virtual space or the real space ⑤. Since the virtual space is accessed, the TLB serves to determine whether the cache memory is hit or mishit ⑦. The address-converted physical address is generated ⑮. The address array determines whether the cache memory is hit or mishit ⑰. Since the cache memory is mishit, the MPU 1 starts the burst transfer to the memory controller 5 and the memory reading ⑲. Then, the cache memory is returned to the idle state ①.

When writing the data in the cache memory, the state of the cache memory is transited in the sequence of ①→④→⑥→ ⑭ → ㉑ → ⑯ →①.

II' Virtual Space TLB Mishit i) Cache Memory Hit

When reading the data from the cache memory, in the idle state ①, the mode decoder 207 determines that the virtual space is accessed ⑤. The TLB determines whether the cache memory is hit or mishit ⑦. Then, the segment table is read ⑨. Next, the page table is read for address conversion ⑪ to provide address conversion. Then page table write ⑬ for rewriting control information (reference bit etc.) on page table is accessed, if it is necessary.

Then, the address-converted physical address is generated ⑮. The address array determines whether the cache memory is hit or mishit ⑰. The data is then read from the cache memory ⑳. The cache memory is returned into the idle state ①.

When writing the data in the cache memory, the state of the cache memory is transited in the sequence of ①→④→⑥→⑧→ ⑩ → ⑫ → ⑭ → ㉑ → ⑯ → ⑱ →①.

ii) Cache Memory Mishit

When reading the data from the cache memory, in the idle state ①, the mode decoder 207 determines that the virtual space is accessed ⑤. Hence, the TLB determines whether the virtual space is hit or mishit ⑦. Then, the segment table is read for address conversion ⑨. Next, the page table is read ⑪ to provide address conversion. Then page table write ⑬ for rewriting control information (reference bit etc.) on page table is accessed, if it is necessary.

Then, the address-converted physical address is generated ⑮. The address array determines whether the cache memory is hit or mishit ⑰. The MPU 1 starts the burst transfer to the memory controller 5 and the memory reading ⑲. Then, the cache memory is returned into the idle state ①.

When writing the data in the cache memory, the state of the cache memory is transited in the sequence of ①→④→⑥→⑧→ ⑩ → ⑫ → ⑭ → ㉑ → ⑯ →①.

III Direct Read/Write

In the idle state ①, the cache memory performs the direct access ② to the control registers of the bus controller 6 and the memory controller 5. The state of the cache memory is returned to the idle state ①.

IV I/O Local Memory Access

Like the direct read/write case, in the idle state ①, the cache memory has direct access to the local memory and I/O ③. Then, the state of the cache memory is returned to the idle state ①.

For releasing a bus right, DMA operation by the external controller 20 etc. might be performed. In this case, it is necessary to watch write the address of the DMA for maintaining coherency between the cache memory 8 and the main memory 19.

That is, when the bus write is released ㉒ from idle state ①, it is determined whether or not the address array is hit ㉓ by watching the address of the external controller 20, continuously. Hence, if it is determined the address array is hit, an entry of cache is nullified ㉔. The above procedure is continued during a period for releasing a bus right, and returns to idle state ① the external controller 20 releases the bus ㉒.

If the address to be accessed is in the I/O unit 9 or the local memory 10 shown in FIG. 2, a timing signal dedicated for the I/O unit or the local memory is output as a memory access control signal 252. That is, the bus controller 6 just transmits the memory access control signal to the I/O unit or the local memory as the access control signal dedicated for the I/O unit or the local memory. At a time, the write data sizing unit 208 and the read data sizing unit 220 are capable of performing data sizing of the data in a manner to correspond to the I/O unit and the local memory. For intervening the bus right, the BUSREQ 254 and the BUSACK 253 are activated. While the bus is being released, the MPU 1 reads an address transmitted from the external bus master through the multiplex bus 251 and activates the cache memory hit determining unit (CMP) 212 to monitor whether or not the cache memory is hit.

Figure 5:
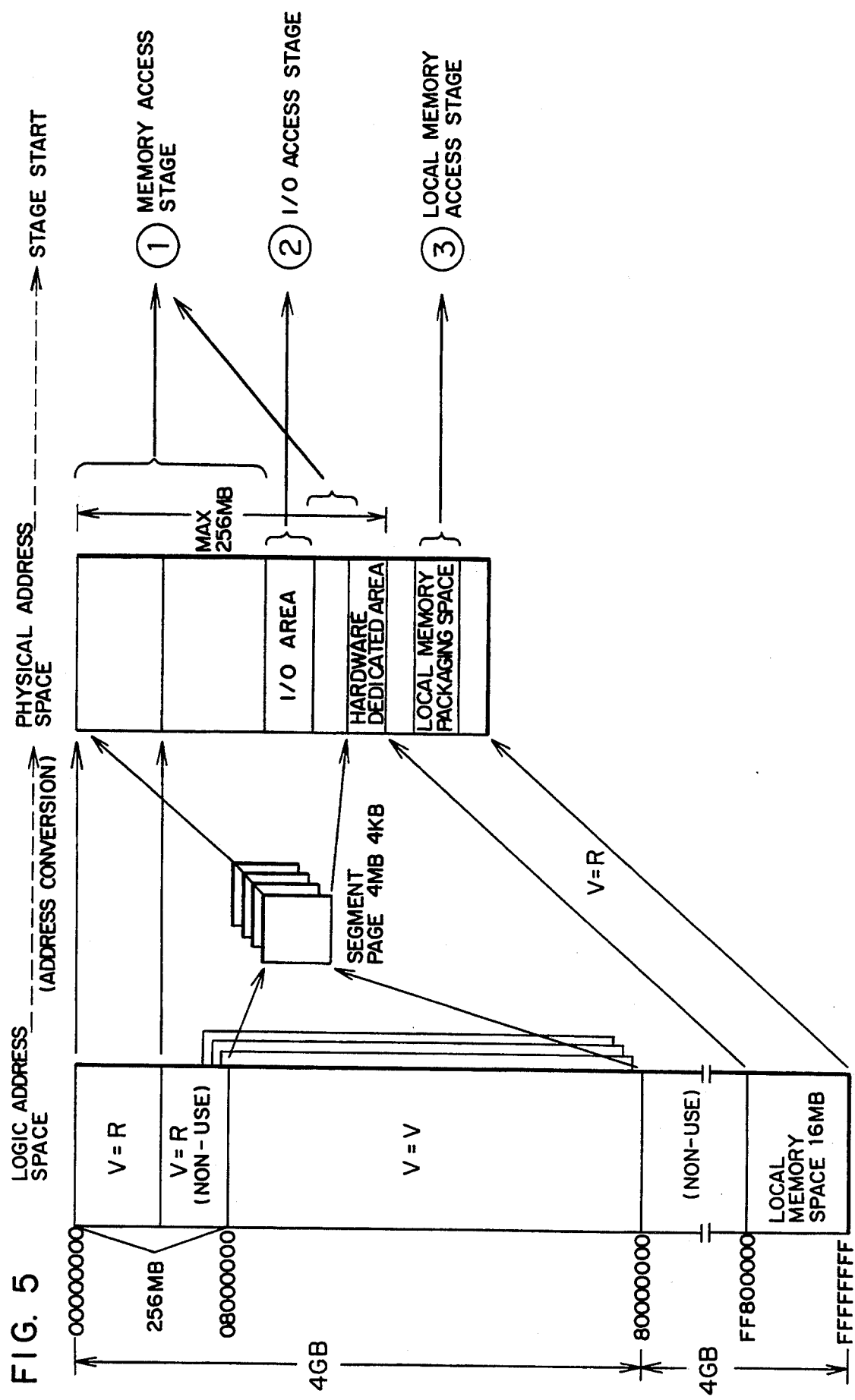
FIG. 5 is a concept view showing how the stage state for each device to be accessed is started.

Next, the description will be directed to how the access control signal is output. With reference to FIG. 5, the logical address space is converted into the physical address space. Then, the converted physical address on the physical address space has the corresponding stage shown in FIG. 5. When it is determined whether or not the cache memory is hit and that the cache memory is mishit, the memory access stage ① is started.

Figure 6:
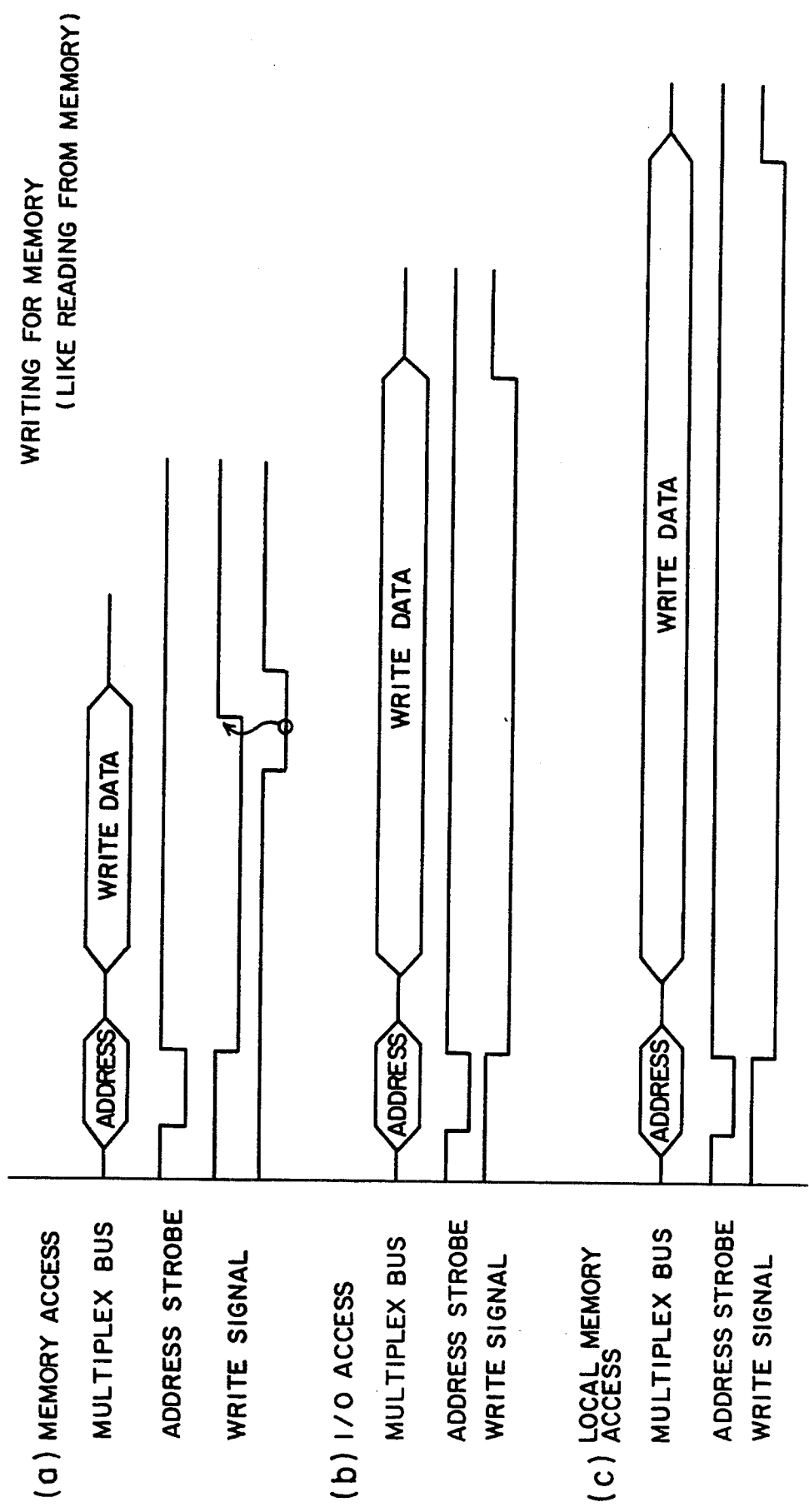
FIG. 6 is a time chart of signals used in the one-chip microprocessor shown in FIG. 1.
Figure 7:
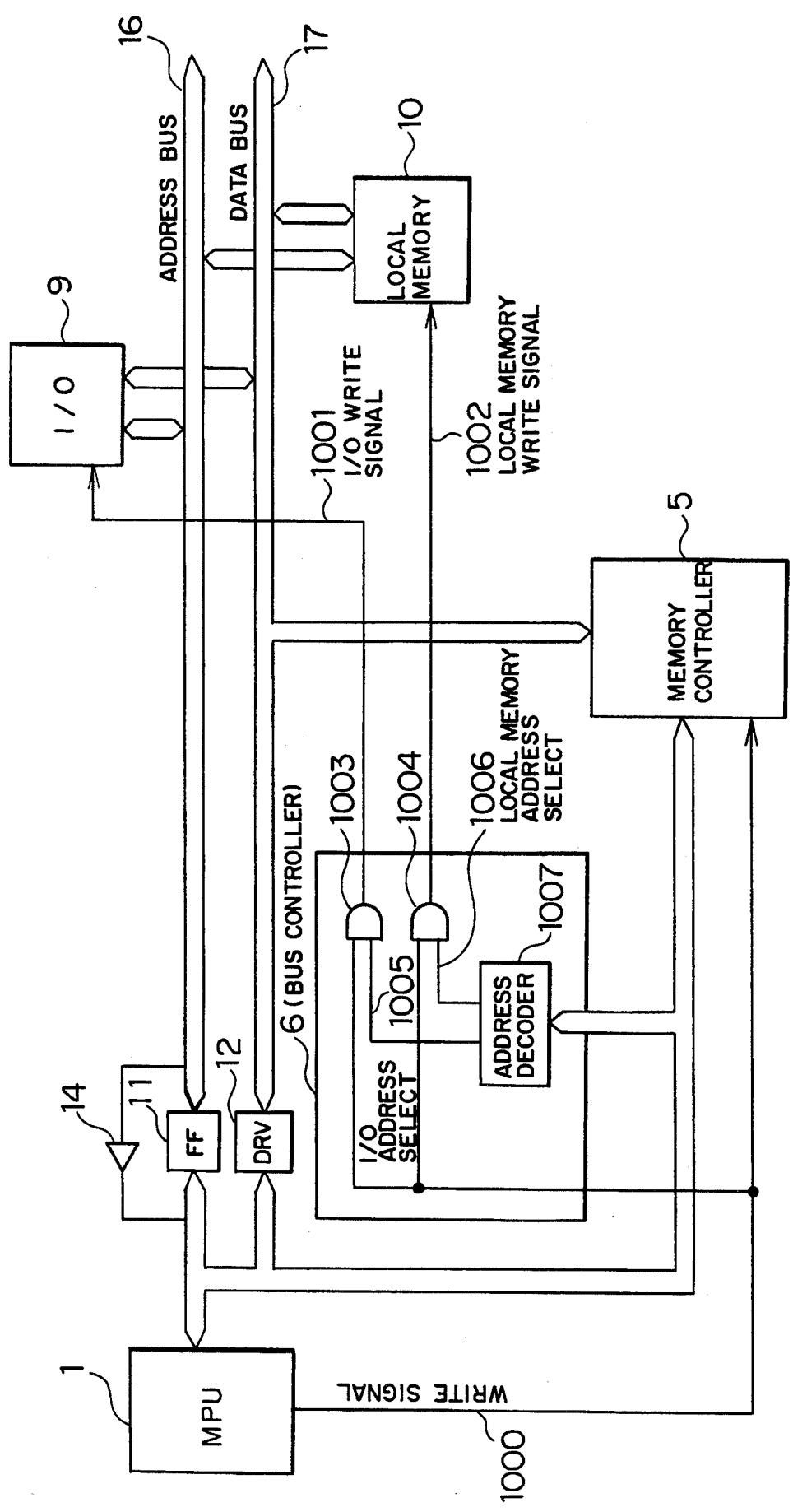
FIG. 7 is a concept view showing the accessing state in the system for each state shown in FIG. 5.

FIG. 6 is a time chart showing some timings on which different write signals are output in a manner to correspond to each destination to be accessed when writing the data in the main memory. Even when reading the data, likewise, the read signals are output in a manner to correspond to each destination to be accessed. FIG. 7 is a block diagram showing the overall system. In case of writing the data in the main memory, it is necessary to provide a write signal dedicated for each of the memory, the I/O unit and the local memory. However, it is not necessary to produce a dedicated stage in the bus controller 6, because the write signal for each of the memory, the I/O unit and the local memory can be produced merely by adding the address decode logic to the write signal 1000 of the MPU 1.

Next, the description will be directed to the bus sizing function done in accessing a memory with reference to FIG. 3. Herein, for simplification, the write data and the other address 226 are selected in place of the selectors 131 and 134. In accessing the memory for writing the data, each byte of the write data register 201 is entered into the selectors 127 to 130. By setting the memory access specifying unit 99 and controlling the selectors 127 to 130 depending on the output of the decoder 105 of the physical address, it is possible to output each byte of the write data register 201 to any of the four bytes (143 to 146) of the multiplex bus. The memory access specifying unit 99 is a register to be directly rewritten by the instruction execution unit in accordance with the microprogram included therein. At a time, the decoder 105 serves to decode the physical address sent from the selector 139 and control the pattern converting unit 106 in such a manner that the pattern converting unit 106 can output to the main memory a bus enable signal for specifying a byte to be accessed and to the local memory or I/O unit an access specifying signal dedicated therefor.

Figure 8:
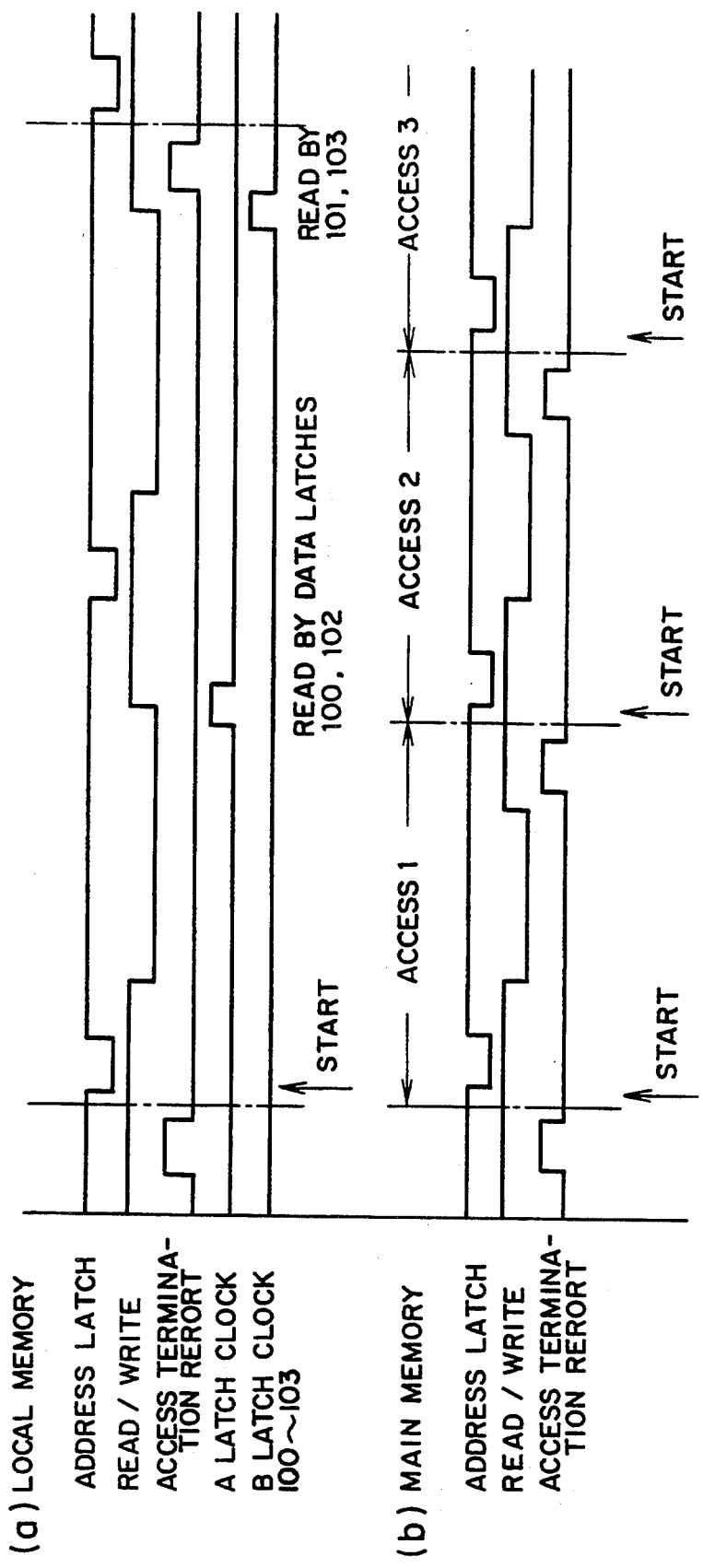
FIG. 8 is a time chart of the signals changed when accessing a local memory.

In accessing the main memory for reading the data, on the other hand, the input data 109 to 112 are sequentially entered into the fourth byte (upper order side) to the first byte of the read data register 200. For accessing the local memory, though the local memory has only 2-byte bus width, the use of the data latches 100 to 103 allows the local memory to read four bytes at one time. That is, the MPU 1 starts to access the memory in response to a memory access start signal 118 output by the memory access specifying unit 99. When the read data is transmitted to the read data register 200, the memory access specifying unit 99 receives the access termination report signal 119, when the access to the local memory is terminated. FIG. 8(b) is a time chart showing timing on which the main memory is accessed. Like the timing shown in FIG. 8(a), by specifying one memory access, two memory accesses are able to be started. The first data is read into the data latches 100 and 102 on the A latch clock timing. Then, by doing one more reading operation, the second data is read in the data latches 101 and 103 on the B latch clock timing. Like the writing case, the selectors 123 to 126 serve to perform the sizing of the data in accordance with the setting result of the memory access specifying unit 99 and the decoded result of the physical address, resulting in being able to read four bytes in the read data register 200 at one time.

The present embodiment is designed to decode an address and start an access stage dedicated for each device and perform the bus sizing in accordance with the decoded address. Hence, it is easily connected to a peripheral device. Further, depending on the type of the device, two memory accesses are automatically started on the hardware in a manner to allow the four-byte read access to be performed for a device with a narrow bus width. This function contributes to simplification of the software.

Figure 9:
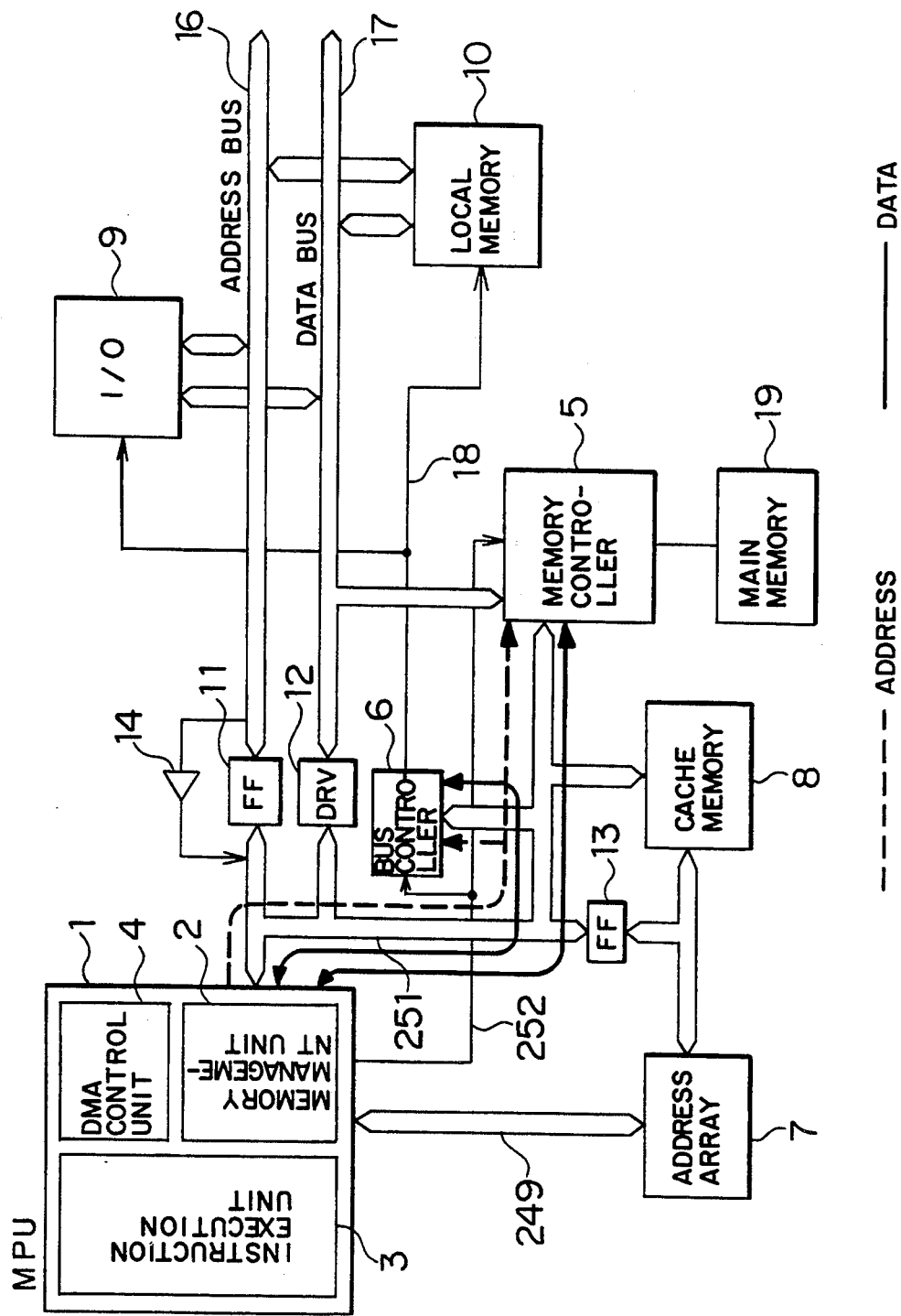
FIGS. 9, 10, 11, 12, 13, 14, 15 and 16 are concept views showing flow of data in the system at each state shown in FIG. 4.

Turning to FIG. 2, which shows the system arrangement according to the present embodiment, as mentioned above, 1 denotes a MPU having an instruction execution unit 3, a memory management unit 2 providing a cache hit determining function, and a DMA control unit 4 integrated on one chip, 6 denotes a bus controller for intervening the bus and controlling the interface of the I/O unit, 5 denotes a memory controller for controlling access to a main memory, 19 denotes a main memory, 7 denotes an address array, 8 denotes a cache memory, 9 denotes an I/O module, 20 denotes an external bus master, 251 denotes a multiplex bus, 16 denotes an address bus, 17 denotes a data bus, 249 denotes an address array data, 14 denotes a driver, 11 denotes an address latch, 12 denotes a bidirectional driver for data, 13 denotes a cache address latch. The memory controller 5 is connected to the multiplex bus 251 and the data bus 17 so that the main controller 5 is allowed to always receive an address from the multiplex bus 251 and latch the address in itself. Hereinafter, the description will be directed to how to use a bus at each mode. When accessing the control registers of the bus controller 6 and the memory controller 5, as shown in FIG. 9, the data and the address are both transferred through the multiplex bus 251. In this DMA method, assuming that the DMA control unit 4 located inside of the MPU 1 is used, the MPU 1 serves to output only the address to the multiplex bus 251, and the memory controller 5 latches the data. Assuming that the DMA control unit 4 located inside of the MPU 1 is not used, that is, the external bus master 20 performs the DMA, the bus master outputs the DMA address onto the address bus 16. At this time, the DMA address is transmitted to the multiplex bus 251 through the driver 14, and the memory controller 5 latches the address transferred on the multiplex bus 251. The data is sent or received from the memory through the data bus 17. During the operation, the MPU 1 monitors the address on the multiplex bus 251 and nullifies the entry in the cache memory 8 if the DMA address hits the cache memory.

The function makes it possible to directly carry out the cache memory access and the main memory access without passing through a driver or the like, thereby improving the memory access speed. Further, since the address of the memory controller is always read out of the multiplex bus, the present embodiment can offer the arrangement which includes a minimum number of pins provided in the memory controller as keeping high performance.

Figure 10:
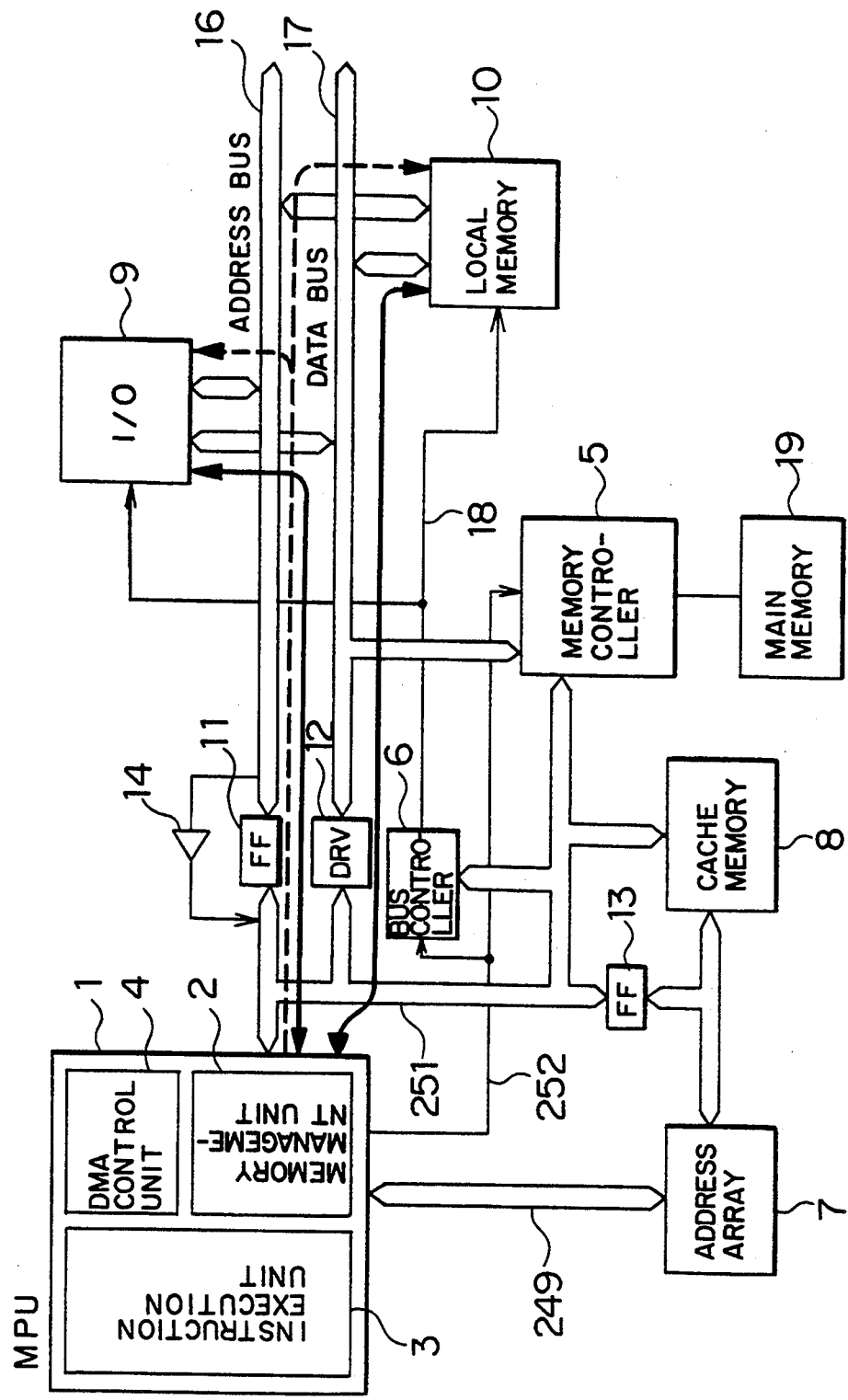

When accessing the I/O unit 9 and the local memory 10, as shown in FIG. 10, the address is transferred through the address bus 16 and the data is transferred through the data bus 17.

The MPU 1 outputs an address to the latch 11 through the multiplex bus 251, and the latch 11 latches the address for defining the address of an address bus 16. The data bidirectional driver 12 is controlled by the control signal. When reading the data, the data output on the data bus 17 is read to the MPU 1 through the multiplex bus 251. When writing the data, the data is transmitted from the multiplex bus 251 to the data bus 17 through which the data is written on the I/O unit 9 or the local memory 10.

Figure 11:
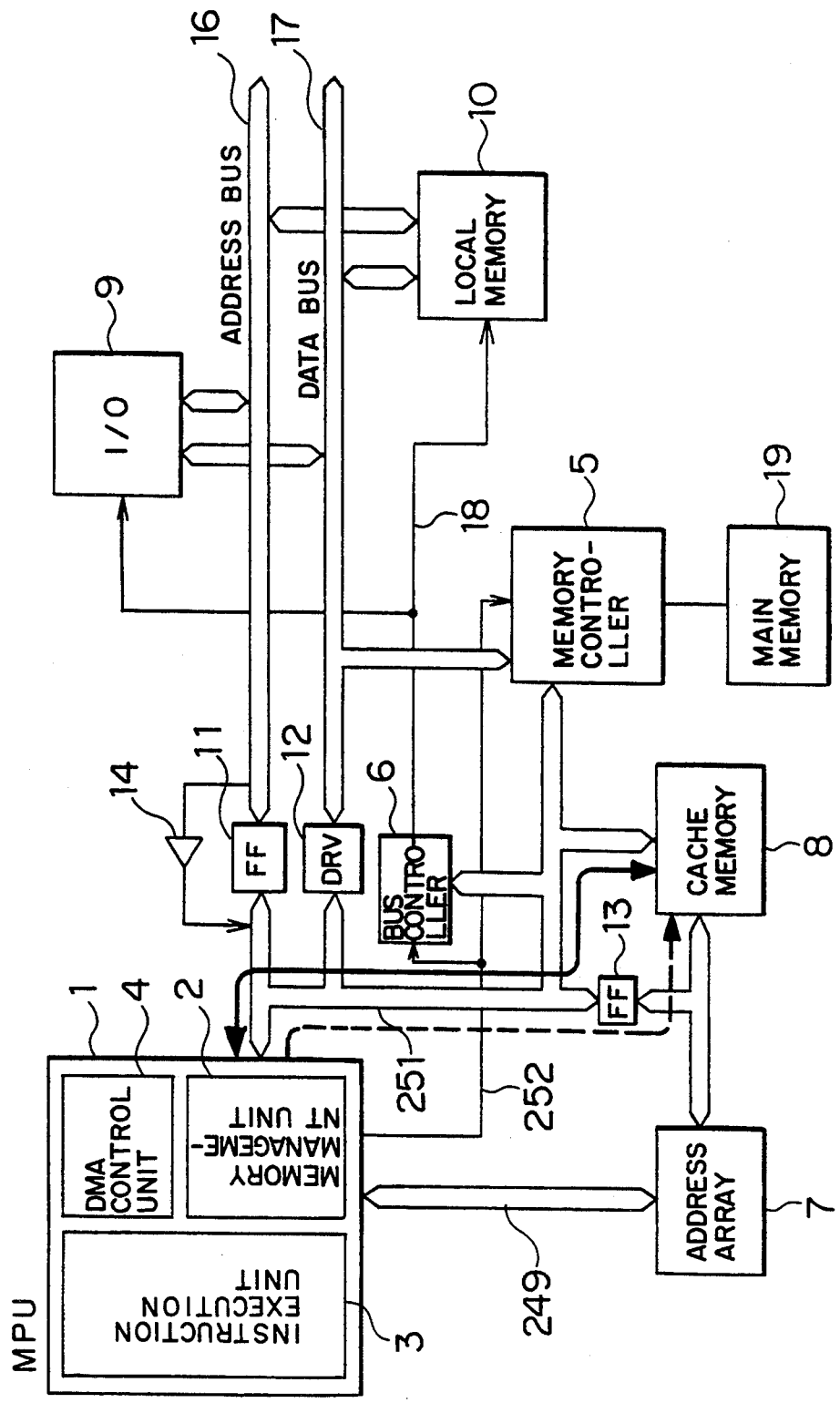

When accessing the cache memory, as shown in FIG. 11, the address and the data are both transferred through the multiplex bus 251.

When accessing the cache memory, the address output from the MPU 1 is latched by the cache address latch 13 and the memory controller 5. The MPU 1 serves to determine whether or not the cache memory is hit based on the address array data 249 output from the address array 7. If it is hit, the MPU controls the cache memory 8 so that the cache memory 8 outputs the data. Then, the MPU 1 reads the data sent through the multiplex bus 251. If the cache memory is mishit, the memory controller 5 serves to start access to the main memory based on the memory access control signal 252. The memory controller 5 outputs the data read out of the main memory 19 to the multiplex bus 251 through which the MPU 1 reads the data. Then, the memory controller 5 serves to replace the data of the mishit block in the cache memory. When accessing the cache memory for writing the data, after the address is latched, the MPU 1 outputs the data onto the multiplex bus 251. If the cache memory is hit, the data is written on the cache memory 8 and the main memory 19. If it is mishit, the data is written on the main memory 19 only.

Figure 12:
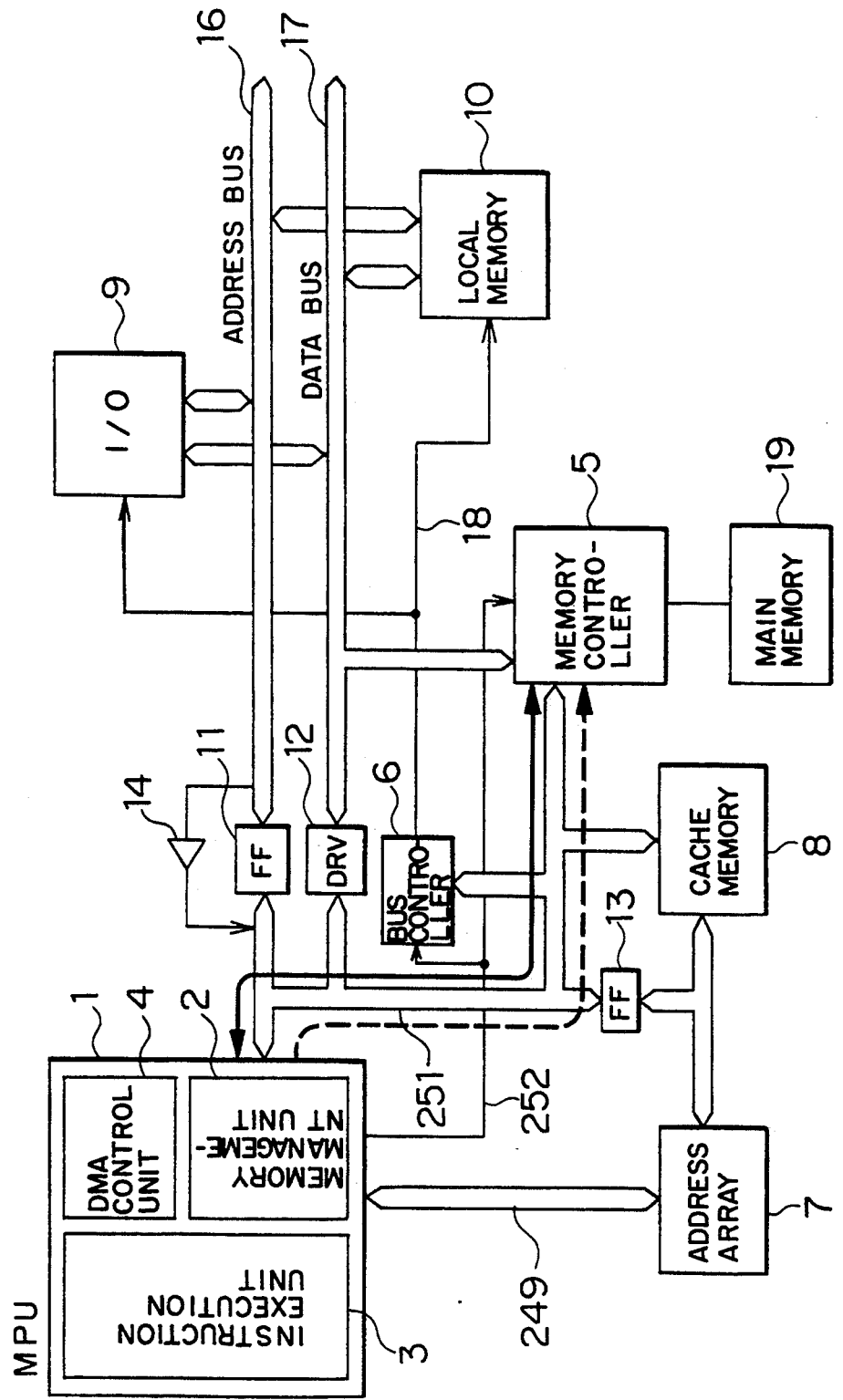

Further, as shown in FIG. 12, the memory access is carried out through the multiplex bus 251 together with the address data.

Figure 13:
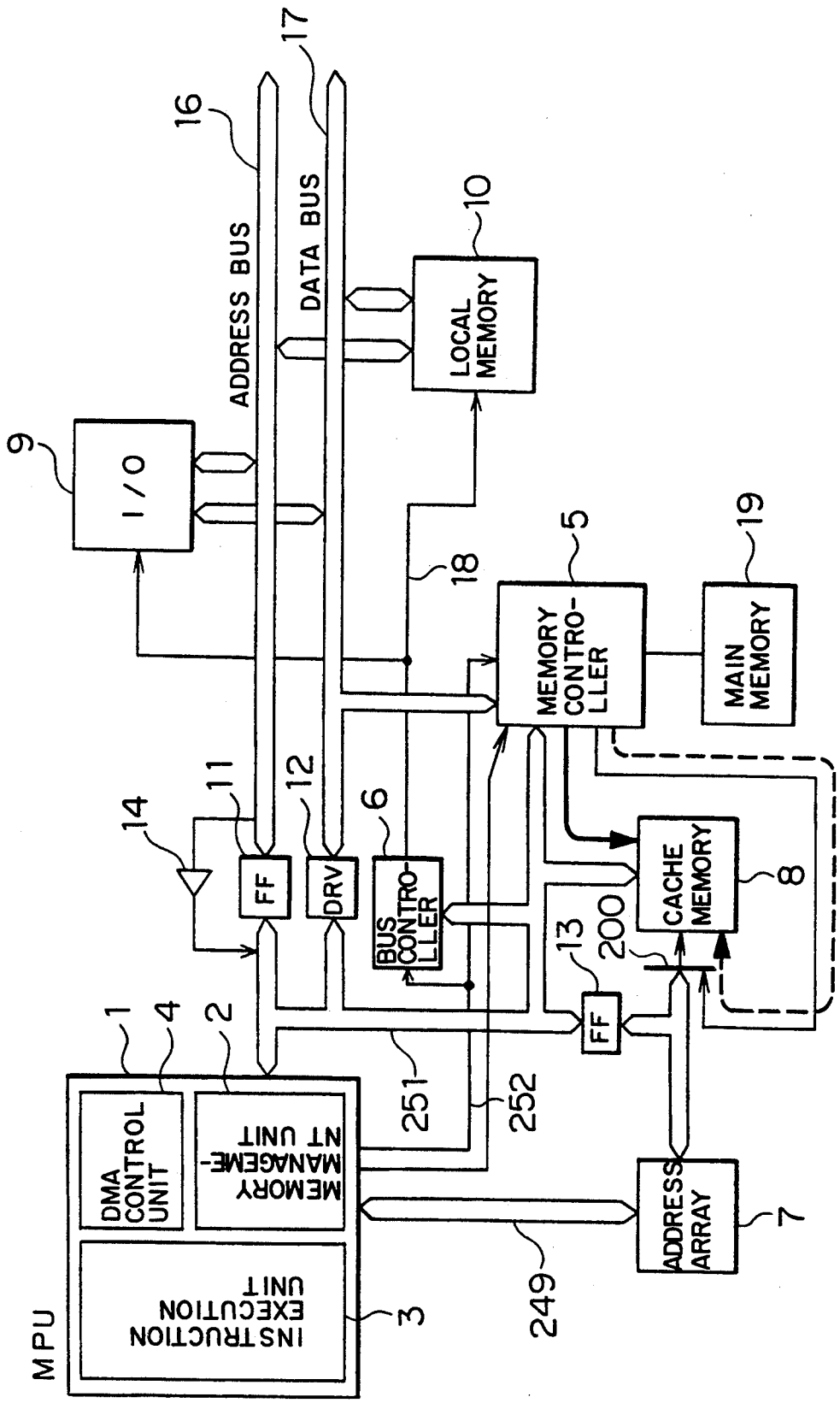

In case of the burst transfer, when accessing the main memory for reading the data, if the cache memory is mishit, as shown in FIG. 13, the MPU 1 starts the replacement of the block of the cache memory against the memory controller 5 in response to the burst transfer request signal. The memory controller 5 serves to transfer data through the multiplex bus 251 as changing the lower-order address in response to the signal.

Figure 14:
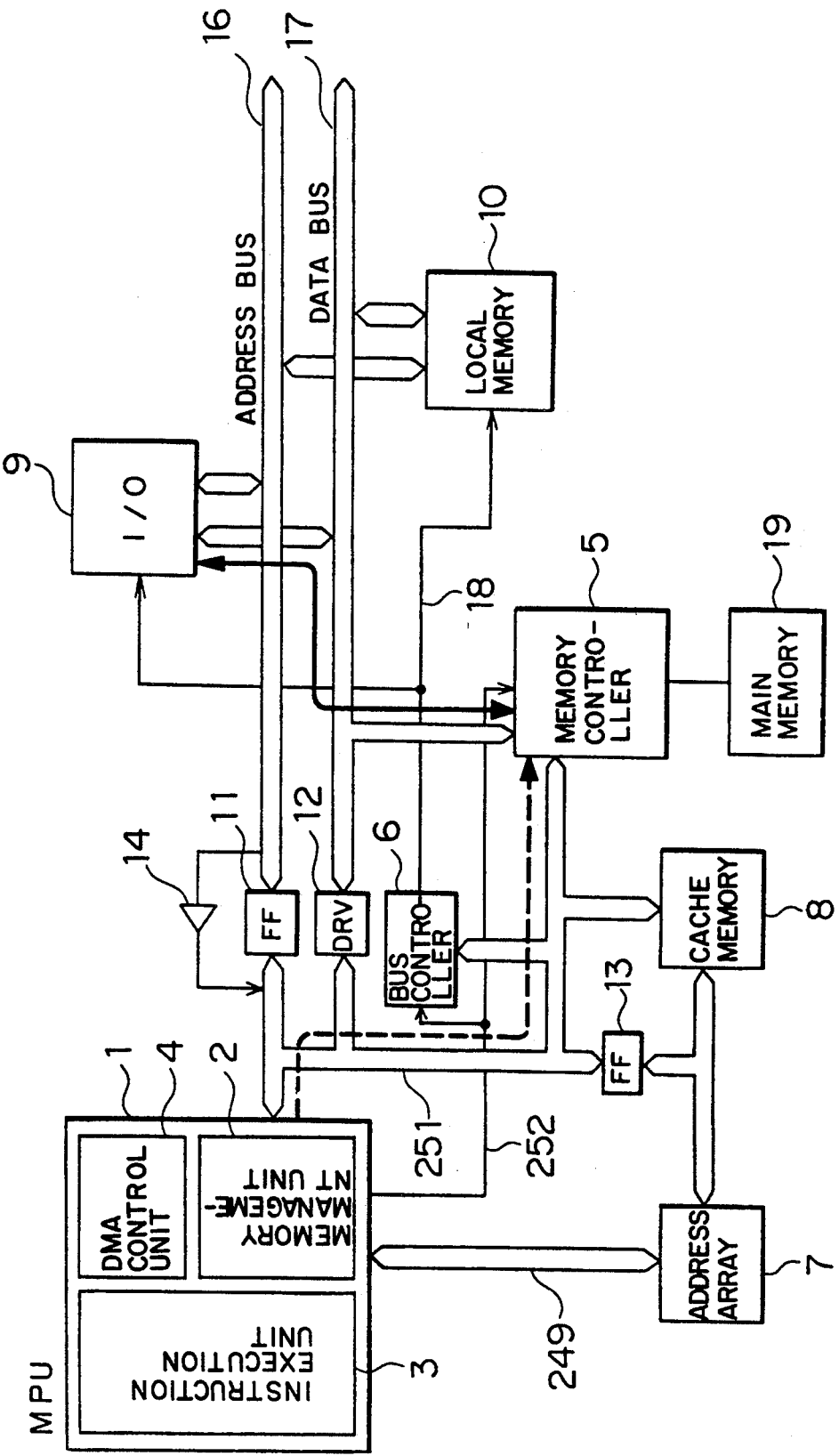

When the DMA control unit 4 located inside of the MPU 1 carries out the DMA transfer, as shown in FIG. 14, the DMA controller outputs only the data and transfer the data between the I/O unit and the main memory. The DMA address passes through the signal line 227 (FIG. 1) and is output to the multiplex bus 251 by which the signal is transmitted. The data transfer between the memory controller 5 and the I/O unit 9 is carried out through the data bus 17.

Figure 15:
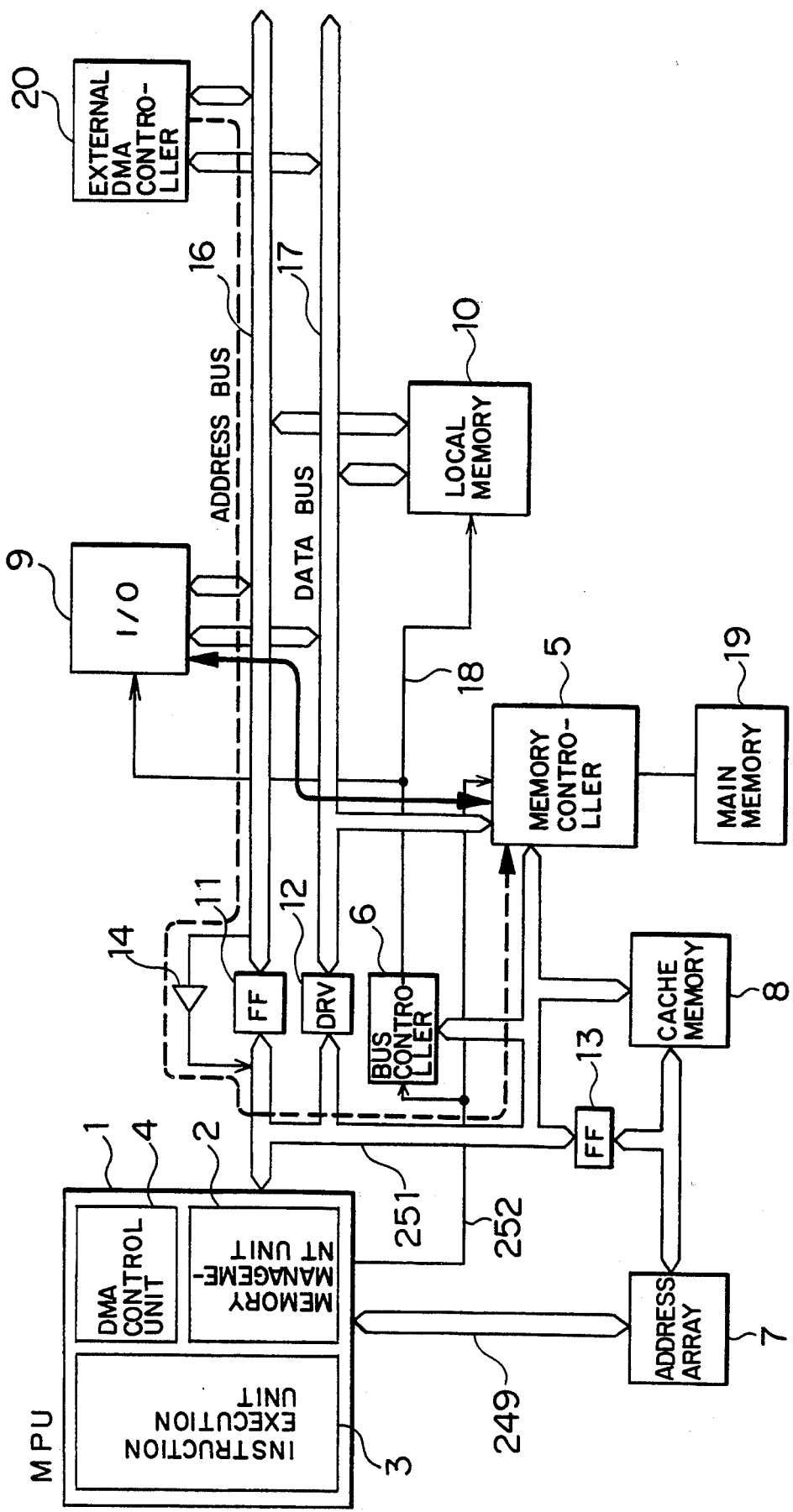

In case the external DMA controller carries out the DMA transfer, as shown in FIG. 15, the address output by the external DMA controller 20 is transmitted through the address-path driver 14 to the multiplex bus 251, and to the memory controller 5. The data is transferred through the data bus 17.

Figure 16:
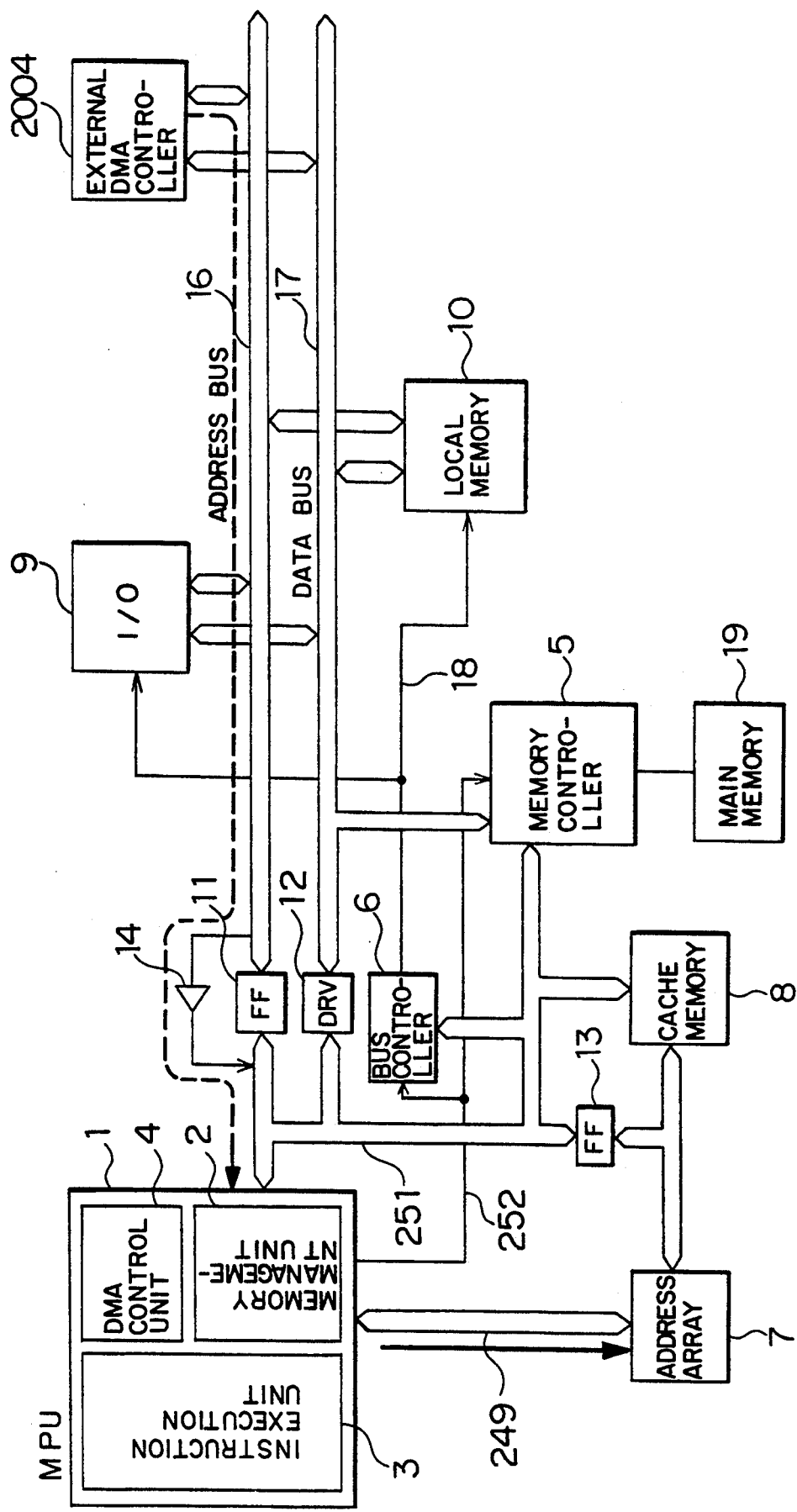

For nullifying the cache memory in monitoring the bus, as shown in FIG. 16, the MPU 1 reads the address output by the external DMA controller 20 from the multiplex bus 251, and the hit determining unit 212 serves to determine whether the cache memory is hit or not. If it is hit for writing the data, the cache memory is nullified (clearing the valid bit) through the address array data bus 249.

As mentioned above, the memory controller 5 of the present system provides an address/data multiplexed bus interface used for memory access, burst transfer of the cache memory, and direct access, as well as an interface for the data bus 17 used for data transfer between the I/O unit and the memory controller 5 itself when directly accessing the memory.

In the foregoing system arrangement, the memory management unit 2, the instruction execution unit 3, and the DMA control unit 4 may be separated to each chip.

In this case, the DMA control unit 4 may be connected to the multiplex bus 251 or the address bus 16 and the data bus 17.

As is understood from the above description, the foregoing embodiment provides an information processing system having a multiplex bus. In this system, by directly connecting the multiplex bus to the cache memory and the memory controller, it is possible to provide the optimal system arrangement which improves of the memory access performance and reduces the number of pins required in the memory controller.

Further, the present system is capable of determining a device to be accessed, starting the corresponding access stage, outputting a control signal, and performing sizing of a bus. The system thus makes it possible to easily connect different devices having different access speeds and arrangements. For the device having a different bus width, the present system is capable of automatically performing two accesses, storing the data in a buffer, and carrying out bus sizing, resulting in simplifying the software.

What is claimed is:

1. A microprocessor system comprising:
    a main processing unit including an instruction execution unit, having a logical address register for storing a logical address to be accessed, and a DMA controller having a DMA register for storing an address for direct memory access;
    hit determining means for determining whether an address hits data stored in an external cache memory;
    an address array controller responsive to the results from said hit determining means for accessing an external address array connected to the cache memory, to control passage of address signals to the cache memory;
    an address bus and a data bus, each said bus connected to said main processing unit and adapted for connection to an external DMA controller;
    means within said hit determining means for comparing an address of said DMA register or of the external DMA controller with address signals from said address array;
    invalidating means responsive to the comparison by said comparing means for invalidating the cache memory address by applying an invalid bit on said bidirectional address array to write the invalid bit at the cache memory address;
    said main processing unit, said hit determining means, said address array controller, and said invalidating means being formed on a single chip as a one-chip microprocessor;
    a memory controller adapted for connection to a main memory;
    a multiplexed address/data bus coupling said main processing unit and said memory controller and adapted for connection to the cache memory;
    an address latch coupling said address bus with said multiplexed address/data bus;
    a driver coupling said data bus with said multiplexed address/data bus; and
    by-pass means for passing an address from said address bus to said main processing unit; and wherein:
    said invalidating means is responsive to address information from said main processing unit DMA controller and the external DMA controller for invalidating a cache memory address; whereby:

address information and data can be transferred by said multiplexed address/data bus between said main processing unit and said memory controller to permit accessing of the main memory;

address information and data can be transferred by said multiplexed address/data bus and said bus means between said main processing unit and said external DMA controller;

address information can be applied from said main processing unit DMA controller through said multiplexed address/data bus and said memory controller to the main memory to cause data to be transferred from the main memory through said memory controller onto said data bus; and address information can be applied from the external DMA controller through said address bus, said by-pass means, said multiplexed address/data bus and said memory controller to the main memory to cause data to be transferred from the main memory through said memory controller onto said data bus, and the address information applied from the external DMA controller through said address bus can be transferred to said hit determining means for comparison with data from the external address array, for invalidating said cache memory in accordance with the result of the comparison.

* * * * *